June 30, 1931.  H. B. GIBBS  1,812,781

COLLAPSIBLE TIRE STAND

Filed Oct. 30, 1930

WITNESSES

INVENTOR
*Harold B. Gibbs*
BY
ATTORNEYS

Patented June 30, 1931

1,812,781

UNITED STATES PATENT OFFICE

HAROLD B. GIBBS, OF BRONXVILLE, NEW YORK, ASSIGNOR TO RUSLING WOOD, INC., OF NEW YORK, N. Y., A CORPORATION OF NEW YORK

COLLAPSIBLE TIRE STAND

Application filed October 30, 1930. Serial No. 492,317.

This invention relates to tire stands and particularly to an improved collapsible tire stand, the object being to provide an improved construction which may be used in a show window, or the floor of a salesroom, or in other places without injuring the floor or any part of the building.

A further object of the invention is to provide a collapsible tire stand which when not in use may be collapsed to a compact body ready for shipment or storage.

An additional object more specifically is to provide a collapsible body made from paper, pasteboard, or other material, and creased, scored or weakened at different points so as to be readily folded when not in use and ready to be unfolded when in use, the structure being so formed as to present a receiving notch or socket for a tire whereby the tire is supported in an upright position and acts as a weight for holding the stand in the desired position.

In the accompanying drawings—

In forming the invention different materials may be used, as for instance, metal, paper, pasteboard or other substances, but preferably a strong grade of pasteboard is used and folded so that the entire tire holder is made from one piece.

Figure 1:
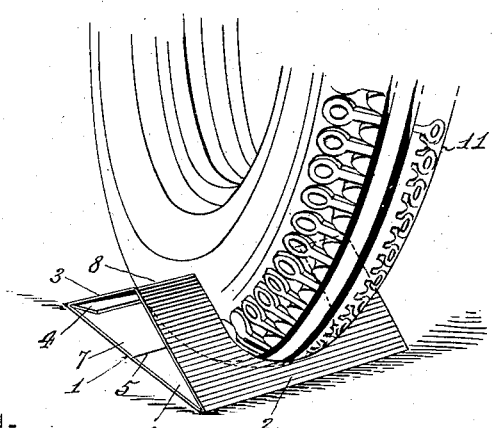
Figure 1 is a perspective view of a stand disclosing an embodiment of the invention, part of the tire being shown in connection therewith.

As illustrated particularly in Figure 1 there is provided a bottom sheet or plate 1, side plates 2 and 3, and connecting flange 4. The flange 4 is adapted to be secured to the bottom sheet or base 1 by adhesive or other securing means as preferred. The bottom plate 1 is divided by a line of creasing 5 into sections 6 and 7, whereby the device may be folded to the position shown in Figure 4. When this is to be done an upward pressure is merely brought to bear on the lower surface adjacent line 5 and said line will move upwardly while the plates 2 and 3 swing along the edge 8.

Where the device is made from pasteboard having a rather stiff center board with a covering of paper on each surface, one covering sheet of paper is cut and also most of the board, as illustrated, along line 8. This is true at each of the points of bending, namely, lines 5, 8, 9 and 10. This leaves ample strength to support any suitable tire 11 and at the same time permits ready folding to the position shown in Figure 4.

Figure 2:
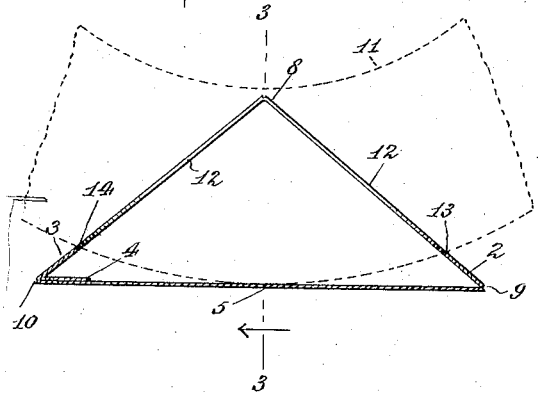
Figure 2 is a transverse sectional view through the stand shown in Figure 1.
Figure 3:
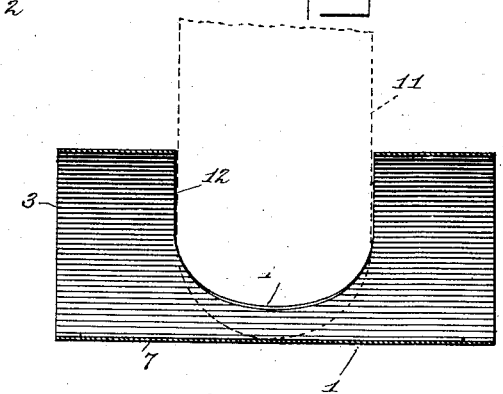
Figure 3 is a sectional view through Figure 2 approximately on the line 3—3.

It will be noted that plates 3 and 4 are each provided with a cut out 12 whereby a socket or opening is provided for the reception of the tire 11. It will be noted that preferably the cutouts 12 are of the proper size to rather snugly fit the tire 11, although this is not absolutely necessary. When the tire 11 is being supported by the stand part of the tire will be contacting with the base which, as shown in dotted lines in Figure 2, and certain other parts will be in contact with the edges of the cut out 12 whereby the tire is held in a substantially vertical position.

As the device is comparatively small and light and is preferably made of paper or pasteboard, it may be placed on the floor of a display room or in a window and moved to any desired point most advantageous to the display of the tire. Also the stand exposes most of the tire to view so that a purchaser may see both sides of the tire and if desired may readily roll the tire out of the stand for testing, and if desired may very easily roll the tire back on to the stand.

It will be noted that the bottom edges 13 and 14 of the cut outs 12 present abutments for slightly resisting the rolling action, this resistance being sufficient to hold the tire in place until urged by somebody or some force to roll.

Figure 4:
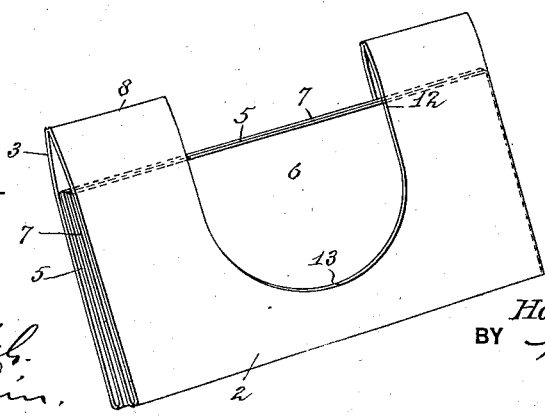
Figure 4 is a perspective view of the stand when collapsed or folded.

From Figures 1 and 4 it will be seen that there are several places on the plates 2 and 3 on which advertising matter may be displayed, to advertise either the firm or the tire.

What I claim is—

1. A collapsible tire stand comprising a substantially triangular shaped sheet structure formed with hinged connections at each corner and at the center of the base, the sides of the stand being notched to receive a tire which is adapted to rest on the base when supported by the stand.

2. A stand formed of material having the characteristics of cardboard, said stand being substantially triangular shape in cross section and provided with a notch in two of the plates for receiving a tire, said notches being of a size to permit the tire to contact with the third plate.

3. A tire stand comprising a base, and a pair of convergent side walls, said side walls being notched substantially to receive a tire so that the tire will engage the edges of the notch and will rest on said base.

HAROLD B. GIBBS.